United States Patent [19]
Iffland

[11] 3,878,705
[45] Apr. 22, 1975

[54] BEARING CAGE AND METHOD FOR PRODUCING A BEARING CAGE
[76] Inventor: Roger L. Iffland, 100 East Hill Rd., Torrington, Conn.
[22] Filed: Oct. 4, 1973
[21] Appl. No.: 403,673

Related U.S. Application Data
[62] Division of Ser. No. 249,087, May 1, 1972, abandoned.

[52] U.S. Cl.............. 72/333; 29/148.4 C; 72/324; 72/332
[51] Int. Cl............................................ B21d 28/00
[58] Field of Search.................... 72/333, 335, 324; 29/148.4 R, 148.4 C; 308/217

[56] References Cited
UNITED STATES PATENTS
2,765,203 10/1956 Barr et al........................... 308/212
3,251,118 5/1966 Pitner.............................. 29/148.4 C
3,365,775 1/1968 Cavagnero et al............. 29/148.4 C
3,431,037 3/1969 Benson........................... 29/149.4 C
3,588,207 6/1971 Greby............................. 29/148.4 C FOREIGN PATENTS OR APPLICATIONS
973,310 1/1960 Germany............................ 308/217
1,145,126 3/1963 Germany....................... 29/148.4 C Primary Examiner—C. W. Lanham
Assistant Examiner—James R. Duzan
Attorney, Agent, or Firm—Frank S. Troidl

[57] ABSTRACT

This invention is a new and novel method for forming a cage for use in bearings, a new and novel system for forming such bearing cages, and a new and novel bearing cage.

An important step in making the bearing cage is the feeding of material such as a solid flat stock between a die and a punch. The punch is narrower than aligned rectangular openings in the die. The new bearing cage comprises projections extending laterally from each side of each bar of the cage. The projections retain rollers in the pockets.

3 Claims, 10 Drawing Figures

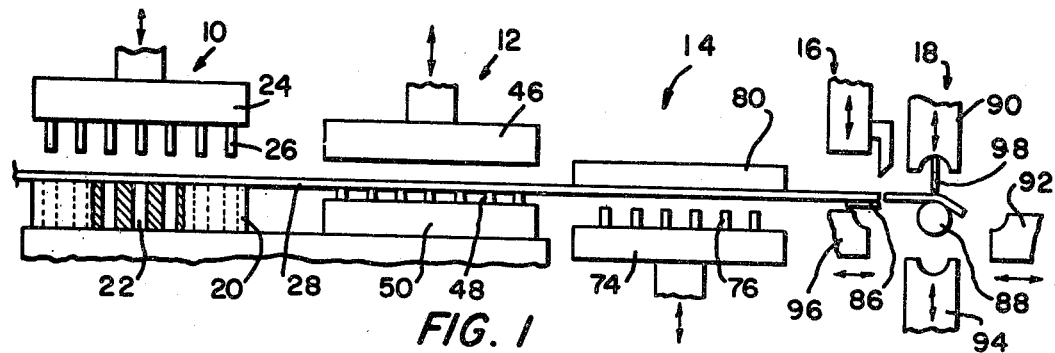
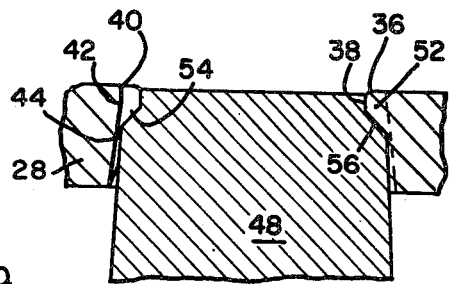
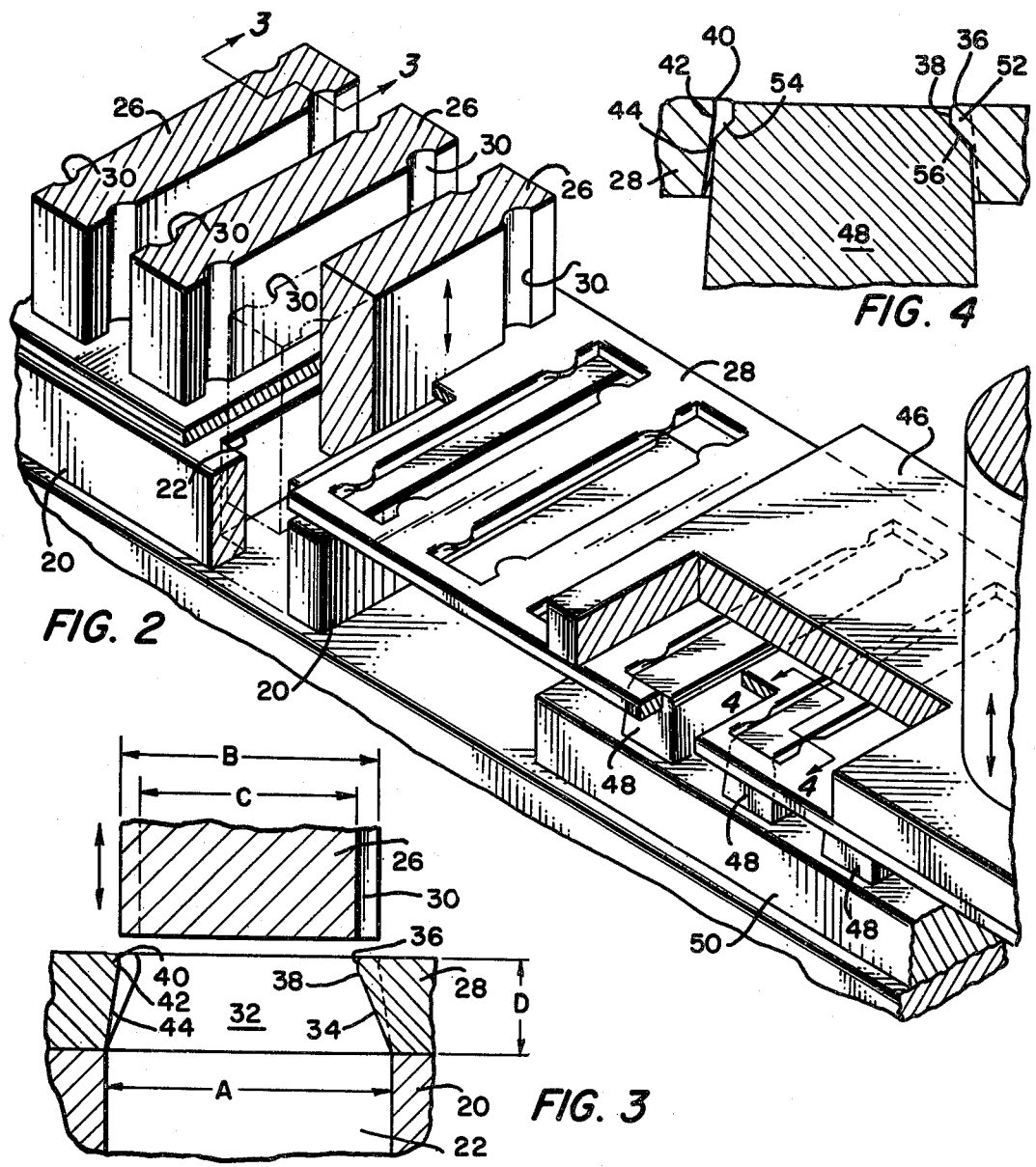
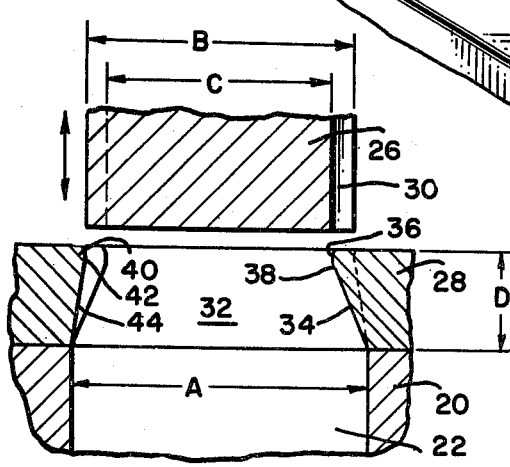

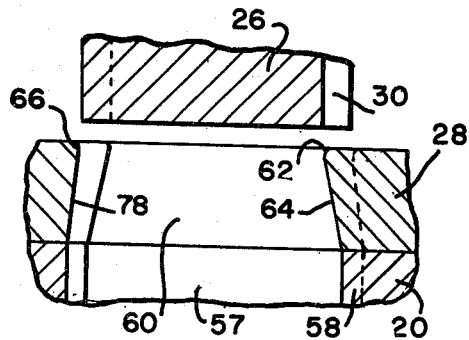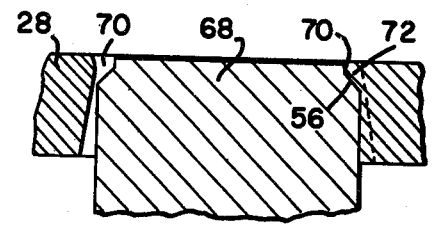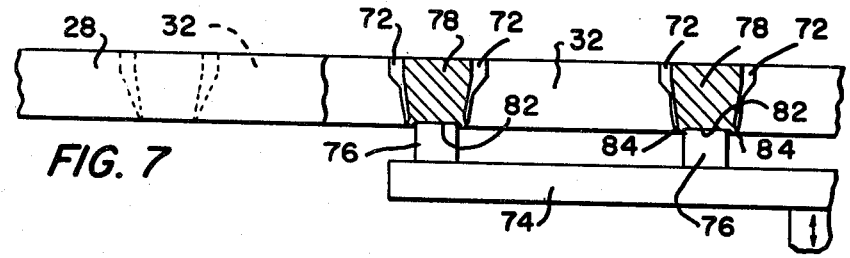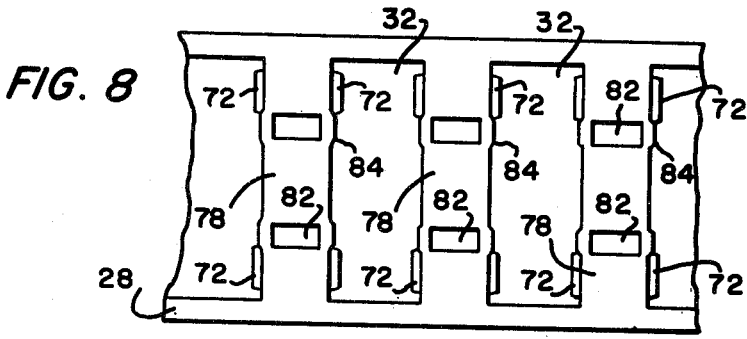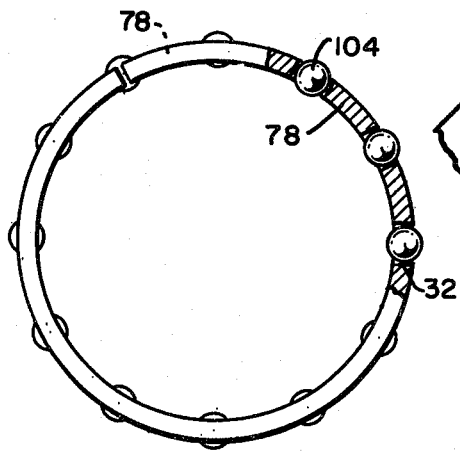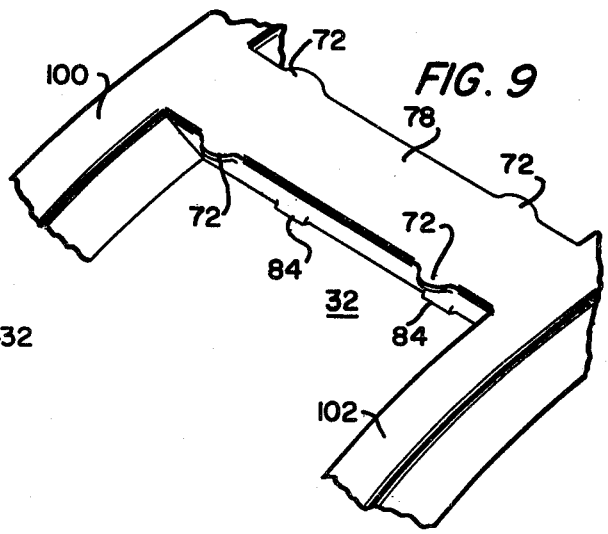

BEARING CAGE AND METHOD FOR PRODUCING A BEARING CAGE

This is a division of application Ser. No. 249,087, filed May 1, 1972, now abandoned.

This invention relates to bearings. More particularly, this invention is a new and novel method and system for producing a novel bearing.

One method of making bearing cages is to continuously feed a flat strip of sheet metal into a system including, among other things, a punch, a cut-off tool, and a mechanism for forming the punched sheet metal into a cage having the desired circumference. Such a method is disclosed in the U.S. Pat. to E. V. Cavagnero, U.S. Pat. No. 3,365,775, issued Jan. 30, 1968. This particular method is used to make a bearing cage with bars having central off-set portions. The off-set portion is used to retain rollers against falling inwardly.

For many reasons it is more desirable to have projection extending into the pockets of the cage to retain the rollers from falling inwardly rather than the off-set width portions of the bar. These reasons include: the rollers are more easily installed, better lubricant storage, the lubricant is more uniformly distributed, and the cage is stronger since it can be made from thicker stock. The projections may be placed to prevent the rollers from falling inwardly, or falling outwardly or both. A cage having such projections is shown by the U.S. Pat. issued to C. F. Benson, No. 3,431,037, issued Mar. 4, 1969. Though the Benson bearing is quite a good bearing, for most uses, those skilled in the bearing art are continuously carrying on research to improve the bearing cages.

In practicing my invention, one can produce bearing cages having projections for retaining the bearings more economically and at a much faster rate with more uniform and exactly dimensioned projections than formerly produced and with stronger cage bars than formerly produced.

The cage produced by my new method and system may include projections for retaining the rollers against inward movement or projections for retaining the rollers against outward movement or both. Also, in utilizing my invention, the bars could have off-set central portions to retain the rollers against inward movement with projections located on the straight portion of the bar adjacent the rim for retaining the rollers against outward movement.

Briefly, my new method for forming cages for use in bearings comprises forming substantially rectangular pockets in a solid material with the pockets having longitudinal tapering sides through at least a portion of the depth of the pockets. Corresponding portions of each longitudinal tapering side extend further into the pockets than the remaining portion. The further extending portions may be more tapered than the remaining portions. The further extending portions are then pressed to form projections in each longitudinal tapering side of the pockets.

Briefly, my new system for forming a bearing cage comprises a die with at least one rectangular opening. A movable punch is spaced from and aligned with the rectangular opening. The punch is narrower than the rectangular openings. One or more grooves formed in the punch forms the further extending portions of the longitudinal tapering sides in flat stock fed between the punch and the die. From the punch and die, the flat stock is fed to a presser which presses the further extending portions into projections.

The new bearing cage produced by my new method and system comprises a plurality of circumferentially spaced bars interconnecting the rims of the cage to form substantially rectangular roller pockets. These bars have substantially the same cross-section throughout their length. A pair of longitudinally spaced projections extend laterally from each side of the bar to retain rollers placed in the pockets. The projections may be located so as to prevent inward movement of the rollers or to prevent outward movement of the rollers or to prevent inward and outward movement.

The invention, as well as its many advantages, may be further understood by reference to the following detailed descriptions and drawings in which:

FIG. 1 is a schematic view partly in cross-section showing my new method and system;

FIG. 2 is an enlarged view, partly in cross-section, of the punch and die, and the presser of my new system;

FIG. 3 is an enlarged view taken along 3—3 of FIG. 2;

FIG. 4 is an enlarged view taken along lines 4—4 of FIG. 2;

FIG. 5 is a view similar to FIG. 3 showing a modified die structure;

FIG. 6 is a view similar to FIG. 4 showing the shape of the projections formed by a modified press after the flat stock has been pierced by the punch of FIG. 5;

FIG. 7 is a side view, partly in section, showing the formation of lugs by the swaging structure of FIG. 1;

FIG. 8 is a view of the underside of the metal strip formed by my new method and system before the strip is cut and formed into an annular shape;

FIG. 9 is an enlarged fragmentary perspective view of one of the bars of my new cage; and FIG. 10 is a side elevational view, partly in section, showing an example of a completely formed cage with rollers placed therein.

Referring to the drawings and more particularly to FIG. 1, my new system for forming a bearing cage comprises a punch and die, indicated generally by the numeral 10, a presser indicated by the numeral 12, a lug former indicated by the numeral 14, a cutter 16, and a means 18 for forming the cut strips of sheet metal into a cage.

The punch and die system 10 includes a die 20 with a plurality of rectangular openings 22. A movable punch support 24 includes a plurality of punches 26 aligned with the corresponding rectangular openings in the die.

A strip of flat metal stock 28 is sequentially fed to each of the members 10, 12, 14, 16, and 18. Pockets are formed in the flat stock by the punch and die system. The structure of the die 20 and the punches 26 are shown in more detail in FIG. 2 and FIG. 3. In these figures it can be seen that the movable punch includes a pair of grooves 30 formed on each longitudinal side of the punch. The grooves are longitudinally spaced apart a predetermined distance so the desired projections can be formed at the proper locations on the flat stock 28. The grooves shown in the figures are substantially semi-circular in shape; however, different shapes of grooves can be used if desired.

As shown in FIG. 3, the width A of the rectangular opening 22 in the die 20 is greater than the width B of the punch 26. Of course, the width A is also greater than the width C between corresponding grooves 30.

By providing a greater width A than the width B, a predetermined shape is formed in the flat stock 28 as it is pierced by the punch 26. As shown in FIG. 3 the grooves 30 provide a pocket 32 which has a tapered portion 34 formed by the grooves as the punch progresses through the flat stock. As the punch progresses through the flat stock, a slightly curved portion 36 is first formed, followed by a straight section 38 and then the tapered portion 34 extending to the entrance of the rectangular opening 22.

That part of punch 26 other than the grooves 30 forms sides in the pocket 32 which includes a slightly curved portion 40 followed by a straight portion 42 and then a tapered portion 44 extending to the entrance of the rectangular opening 22. The tapered portions 34 formed by the groove 30 are more tapered than the tapered portions 44.

The difference in width between the punch 26 and the opening 22 is carefully chosen to provide the proper shape and tapers. It has been found that a difference in width ranging from five percent to ten percent of the thickness D of the flat stock 28 provides a very satisfactory shape.

After the flat stock 28 has been pierced by the punches 26, the flat stock is fed to the pressing apparatus 12. As shown in FIG. 2, the pressing apparatus 12 comprises a movable flat member 46. The movable flat member presses the flat stock onto a plurality of anvils 48 supported by an anvil support 50.

As shown more clearly in FIG. 4 as the flat stock 28 is pressed over the anvil 48, the tapered portions 34 (see FIG. 3) are pressed or extruded by the anvil 48 to form the projections 52. Each anvil is provided with the longitudinal chamfers or radiused forms 54 and 56 to provide spaces for the formation of the projections 52.

The embodiment of punch and die shown in FIG. 5 differs from the embodiment of punch and die shown in FIGS. 1 through 4 in that the openings 57 in the die 20 have protuberances 58 in the longitudinal sides of the rectangular opening. Preferably, two protuberances are formed on each longitudinal side of the rectangular opening. The protuberances are aligned with corresponding grooves 30 in the punch 26. With the embodiment of FIG. 5, the pockets 60 formed in the flat stock 28 consist of the slightly curved portion 62 and tapering portion 64 formed by the grooves 30 and the slightly curved portion 66 and tapering portion 78 formed by the remainder of the punch 26. This procedure allows greater protuberances in the window than can be obtained by the procedure shown in FIG. 3. The spacing between the punch and the opening preferably range from five percent to ten percent of the thickness.

As shown in FIG. 6, the anvil 68 has longitudinal chamfers or radiused form 70 and 72. The pressing of the flat stock 28 over the anvil forms projections 72 on the outer edge of the flat stock. There are, of course, the same number of projections as grooves 30 in the punch 26.

The embodiment of FIGS. 1 through 4 and the embodiment of FIG. 5 and FIG. 6 illustrate a method and system for forming projections to prevent outward movement of the rollers ultimately placed on the pockets. However, if desired, the projections could be formed on the inner edges of the pockets to prevent inward movement of any rollers placed in the pockets.

This could be done be reversing the position of the die 20 and punch 26 and reversing the positions of the anvils and the flat press 46. Also, if desired, my new method and system can be used to place projections on the bars of a cage with the bars having an off-set central portion to retain the rollers against inward movement. Of course, since the off-set portions prevent inward movement, it is only necessary to place the projections on the straight portions of the bar adjacent the rims to prevent outward movement.

After the projections are formed on the flat stock 28, if desired, the flat stock may be fed directly to the cutter 16 and the means 18 for forming the strip into an annular cage. However, if it is desired to retain the rollers against falling both inwardly and outwardly, the flat stock may be first fed to the swaging means 14.

As shown more clearly in FIG. 7 and FIG. 8, the swaging means may consist of a movable die 74 which supports a plurality of swages 76. The swages are located to slightly compress the underside of the bars 78. As shown in FIG. 1, a heavy flat member 80 is pressed against the top side of the metal strip 28.

The swages 76 form small recesses 82 (see FIG. 7 and FIG. 8) in the underside of the bars 78 on flat stock 28. These recesses are formed as the metal material of the bars 78 are extruded outwardly by the swages 76 to form the lugs 84 on the inner side of the bars 78. Preferably, two longitudinally spaced lugs are provided on each longitudinal side of the bars.

Again referring to FIG. 1, after the lugs 84 are formed, the metal strip 28 is fed to the cut-off tool 16. The cut-off tool is movable vertically toward and away from the strip and cooperates with a small anvil 86 to effect the cut-off of a predetermined length of the strip to eventually provide an annular cage of the desired circumference. From the cut-off tool, the strip is fed to the annular forming member 18. The forming member 18 includes a mandrel 88 and four reciprocal tools 90, 92, 94, 96. The reciprocal tools are disposed in a hub-spoke arrangement about the mandrel 88 and are operated sequentially to form the cut-off strip into a ring. The strip is initially secured in place on the mandrel 88 by a hold down device 98.

After the strip has been formed into an annular member of the desired circumference, the ends may be welded together.

It should be noted that though the inside widths of the pockets 32 formed by the punch and die systems are greater than the outside widths, the inside widths are decreased when the strip is formed into an annular shape. The resulting cage includes pockets which are substantially the same width throughout their depth.

The new cage formed by my new method and system as shown in FIGS. 9 and 10 includes a pair of spaced apart annular rims 100 and 102. A plurality of circumferentially spaced bars 78 interconnect the rims to form substantially rectangular roller pockets 32. The bars are substantially the same cross-section from one rim to the other rim. In the embodiment shown in FIG. 9, the longitudinally spaced projections 72 extend laterally from each side of the bar a sufficient distance to retain the rollers 104 (see FIG. 10). The projections shown in FIG. 9 are located adjacent the outer edges of the bars 78. Of course, if desired, the projections could be formed on the inner edges. Also, in the embodiment of FIG. 9, lugs 84 extend from each side of the bar. These longitudinally spaced lugs are adjacent the inner edges of the bars.

An important feature of my new cage is that because of the consistent cross-section, the bars 78 are of much greater strength than other currently used bars which are made by cutting off a side portion of the bars in order to form projections. This provides greater strength in the bars by eliminating localized stressing.

In operation and referring to FIG. 1, the flat stock 28 is cyclically fed first into the punch and die system 10 where it is pierced by the punch and die modification of FIG. 3 or the punch and die modification of FIG. 5. The flat stock 28 is then fed to the pressing system 12 where the projections are formed with an anvil-shaped-like the modification of FIG. 4 or the modification of FIG. 6. If desired, the strip 28 is then fed to the swaging system 14 where the lugs 84 are formed as shown in FIG. 7. A desired length of the strip is then cut off by the cut-off means 16 and then formed into an annular cage by means 18.

I claim:

1. In a system for forming a bearing cage from strips of solid flat stock:

a die having at least one substantially rectangular opening;

a movable punch spaced from and aligned with the substantially rectangular opening in the die, said punch having less width than the width of the substantially rectangular opening in the die, and also having at least one groove formed on each longitudinal side;

means for feeding solid flat stock between the punch and the die whereby substantially rectangular pockets are formed in the flat stock having longitudinal tapering sides with those portions formed by the grooves in the punch extending further into the pockets than the remaining portions; and means located downstream for pressing the further extending portions into projections.

2. A system in accordance with claim 1 wherein there are two spaced grooves formed on each longitudinal side of the punch.

3. A system in accordance with claim 2 wherein the substantially rectangular opening in the die has protuberances aligned with the grooves in the punch.

* * * * *